United States Patent [19]
Fukui

[11] Patent Number: 5,602,753
[45] Date of Patent: Feb. 11, 1997

[54] METHOD AND APPARATUS FOR ESTIMATING POWER DISSIPATION AND METHOD AND APPARATUS OF DETERMINING LAYOUT/ROUTING

[75] Inventor: Masahiro Fukui, Osaka, Japan

[73] Assignee: Matsushita Electric Industrial Co., Ltd., Osaka, Japan

[21] Appl. No.: 423,844

[22] Filed: Apr. 18, 1995

[30] Foreign Application Priority Data

Apr. 19, 1994 [JP] Japan .................................. 6-080044

[51] Int. Cl.$^6$ ................................................. G06F 17/50
[52] U.S. Cl. ......................... 364/459; 364/458; 364/578; 364/554
[58] Field of Search ................................... 364/488, 489, 364/490, 491, 578, 554, 480–487

[56] References Cited

U.S. PATENT DOCUMENTS 5,434,794  7/1995  Coudert et al. ......................... 364/489

FOREIGN PATENT DOCUMENTS 4-130661  5/1992  Japan .
5-265605  10/1993  Japan .
6-60139  3/1994  Japan .

OTHER PUBLICATIONS

Chen et al., "An Approach to Functional Level Testability Analysis," IEEE, 1989, pp. 373–380.
Melmet Cirit, "Switch Level Random Pattern Testability Analysis", IEEE, 1988, pp. 587–590.
Ubar et al., "Functional Level Testability Analysis for Digital Circuits," IEEE, 1993, pp. 545–546.
Abdallah et al., "A New Generation of Digital VLSI CAD Tools based on Probability," IEEE, 1995—pp. 345–352.
Benini et al., "State Assignment for Low Power Dissipation," IEEE, 1995, pp. 258–268.
Shen et al., "On Average Power Dissipation and Random Pattern Testability of CMOS Combinational Networks," IEEE, 1992, pp. 402–407.
S. Devadas et al., "Estimation of Power Dissipation in CMOS Combinational Circuits Using Boolean Function Manipulation", IEEE Transactions on Computer–Aided Design, vol. 11, No. 3, pp. 373–383, Mar. 1992.

*Primary Examiner*—Kevin J. Teska
*Assistant Examiner*—Thai Phan
*Attorney, Agent, or Firm*—McDermott, Will & Emery

[57] ABSTRACT

This invention discloses a method of estimating power dissipation in an electrical circuit formed by a plurality of elements and a plurality of signal lines for input/output transfer. The probability that an output signal makes a transition in response to a change in an input signal is found. Based on this, a formula is found which expresses the output signal transition probability as a function of the input signal transition probability. This method has the following steps. An input signal transition probability is given. By making use of the formula, an output signal transition probability is found in relation to an input signal having the given signal transition probability. Estimation of power dissipation is performed by summing products obtained by multiplying each transition probability by each signal line's load. Computation of the signal transition probability starts at the input side. As a result of such arrangement, power dissipation can be estimated from each signal transition probability.

10 Claims, 9 Drawing Sheets

Fig.3

```
Cell name = A B C
Pin name = IP1 : input , IP2 : input , QP1 : input
           OP1 : output, OP2 : output
Data : P, O
Control : Q
Truth Table
   IP1     IP2     QP1     OP1     OP2
    0       0       0       0       0
    0       0       1       1       0
    0       1       0       0       1
    0       1       1       0       1
    1       0       0       1       0
    1       0       1       1       1
    1       1       0       0       0
    1       1       1       0       0
Signal Change Transfer Probability
           IP1      IP2      QP1
PvOi-1    .25      .25      .25
PvOi-2    .75      .75      .25
```

Fig.4

NET SIGNAL STATISTICAL INFORMATION

| Data name | Net name | bunpu | change ratio(%) |
|---|---|---|---|
| Y | YY | regular | 10 |
| Colore | CCC | plane | 3 |

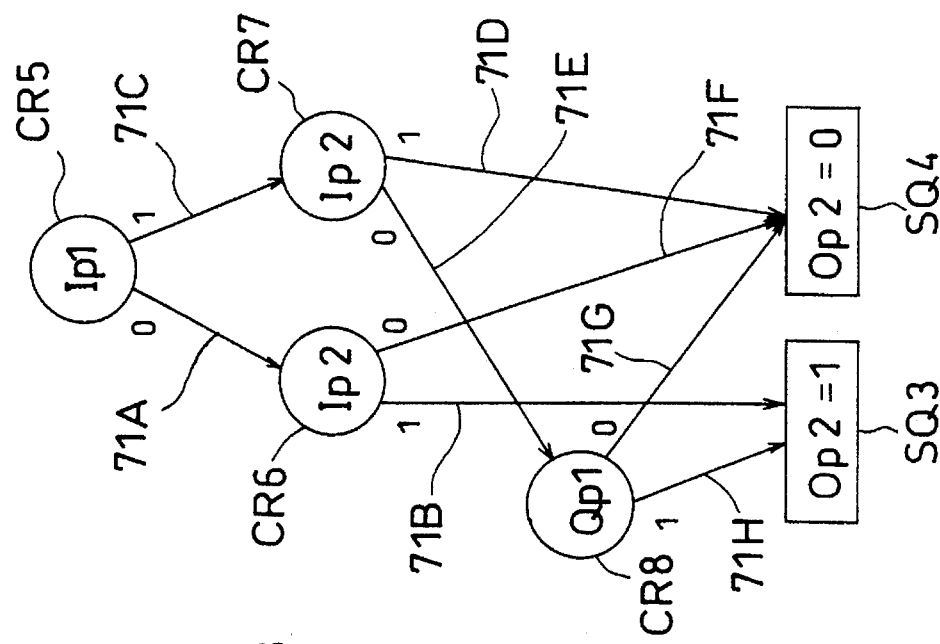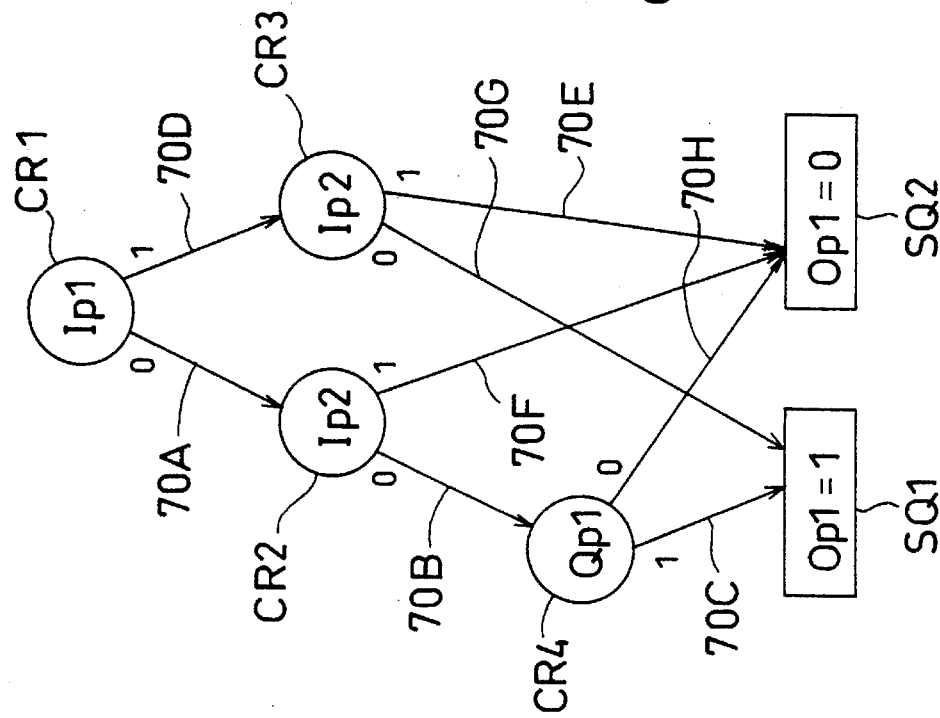
Fig.13a
Fig.13b

5,602,753

METHOD AND APPARATUS FOR ESTIMATING POWER DISSIPATION AND METHOD AND APPARATUS OF DETERMINING LAYOUT/ROUTING

BACKGROUND OF THE INVENTION

This invention relates to an electrical circuit (e.g., CMOS LSI) formed by elements and signal lines. More particularly, it pertains to a method and apparatus for estimation of power dissipation in an electric circuit, and to a method and apparatus of determining a layout of circuit components and interconnection routing of signal lines to connect together the circuit components (hereinafter called the layout/routing plan).

As the density of SIC (semiconductor integrated circuit) increases, the number of elements forming a circuit increases. Therefore, a way off arranging a great number of elements and providing adequate interconnecting routing to them has been considered very important. Suppose two different circuits. These two circuits employ the same number of elements interconnected together with the same number of signal lines, but they are formed using different layout/routing plans. In such a case, there might be a difference in the power dissipation between the two circuits. Greater power dissipation results in power loss and presents the problem that a way of releasing developed heat to outside the circuit must be found.

If exact pre-estimation of power dissipation in an electric circuit is possible, then, based on this estimation, an optimum layout/routing plan can be designed with ease. For example, a way of pre-estimating power dissipation is shown in "VLSI Design I," the Iwanami Koza Microelectronics Series, published by IWANAMI SHOTEN. In this approach, a signal line, which establishes connections among many points in a circuit, is measured to find its approximate virtual wiring length. Based on the found virtual wiring length, an evaluating function is set, and an iterative improvement method is used to minimize an objective function. In other words, if the cross-sectional area of a wire is almost constant, then the wire load is directly proportional to the wiring length. As a result, those such as the power dissipation and the signal delay can synthetically be evaluated from the virtual wiring length.

Japanese Patent Application, published under Pub. No. 2-171861, discloses another technique. In accordance with this technique, an electrical circuit is assigned a predetermined test pattern. The number of times each signal line of the electrical circuit makes a switch is found by means of, for example, a logical simulator. The result found is then multiplied by a wiring capacitance of each signal line. The products found are summed together to estimate power dissipation in the circuit.

The former technique considers only the approximate virtual wiring length. This produces the problem that exact estimation of power dissipation is difficult to find. The reason is explained by taking, for example, two different circuits having the same total wiring length. In this case, if one of the two circuits switches more times than the other circuit then it will dissipate more power than the other circuit. Accordingly, estimating power dissipation by considering only the wiring length may cause serious error.

The latter technique is a technique that makes use of the fact that a very large current flows when a signal is changing. The number of times such a signal change is made is considered, which enhances the power dissipation estimation accuracy. However, execution of logical simulations requires an appropriate test pattern, and preparing such a test pattern is very time consuming. Further, execution of logical simulations itself is also very time consuming.

SUMMARY OF THE INVENTION

With a view to providing a solution to the above-noted problems with the prior art techniques, the present invention was made.

It is a first object of the present invention to provide an improved method capable of estimating power dissipation in an electric circuit at a relatively high accuracy, in a short calculation period of time, and in a simple manner, without depending on logical simulations employing test patterns.

It is a second object of the present invention to provide an improved method of determining a layout of elements of an electric circuit and an optimum interconnection routing plan for interconnecting the elements in such a way as to minimize power consumption.

It is a third object of the present invention to provide an inexpensive apparatus capable of estimating power dissipation in an electric circuit at a relatively high accuracy, in a short calculation period of time, and in a simple manner, without depending on logical simulations employing test patterns.

In order to accomplish the first object, the invention provides a method for estimation of power dissipation. More specifically, the present invention is to provide a method of estimating power dissipation in an electrical circuit comprising an element, an input line coupled to the element to receive input signals, and an output line coupled to the element to provide output signals.

This method comprises:

a first step of finding, based on a product obtained by multiplying a probability that an input signal to the element makes a transition by a probability that a corresponding output signal from the element makes a transition in response to a change in the input signal, a formula by which the output signal transition probability is expressed as a function of the input signal transition probability;

a second step of assigning a predetermined input signal transition probability to an input signal;

a third step of finding, when the input signal having the predetermined transition probability is applied to the electrical circuit, a probability that a corresponding output signal from the element makes a transition, by making use of the formula; and a fourth step of estimating the power dissipation by multiplying the input signal transition probability by the input line's load and multiplying the output signal transition probability by the output line's load, and by summing together products found.

By making use of the aforesaid formula, if a probability that an input signal to a specific element makes a transition is given, then a probability that a corresponding output signal from that element makes a transition can be obtained. Generally, in electrical circuits within which transistors are arranged, signal lines have their respective capacitances and maximum power is dissipated at the time of signal switching between on and off. Therefore, estimation of exact power dissipation is performed taking into account the frequency that a signal makes a transition. The present invention can provide an improved method capable of estimating power dissipation in an electric circuit at a relatively high accuracy, at a high speed, and in a simple manner, without depending on logical simulations that require test patterns.

In the above-described method, if the electrical circuit comprises two or more the elements connected together in series, the formula of the third step is used to first find, from a probability that an input signal to a first element of the plural elements makes a transition, a probability that a corresponding output signal from the first element makes a transition, and then to find, from a probability that an input signal to a second element of the plural element makes a transition, or from the output signal transition probability of the first element, a probability that a corresponding output signal from the second element makes a transition.

In the third step, the probability that an output signal from the first element makes a transition is found from the probability that an input signal to the first element makes a transition acting as a variable. This is followed by finding the probability that an output signal from the second element makes a transition from the probability that an input signal to the second element makes a transition. In this way, every output signal probability is found.

In the first step of the above-described power dissipation estimating method, the formula may be found by making use of a truth table for input and output of each element or by making use of a binary decision diagram (BDD).

In the second step of the above-described power dissipation estimating method, if the input signal is formed by an item of data of plural bits, a distribution state of the input signal and an upper limit of variation in the value of that data item per one clock signal are determined, to find a probability that each of the bits makes a transition in value after one clock signal is applied.

If the input signal is a data item made up of a plurality of bits, then no signal change exceeding numeric values represented by the bits takes place. Accordingly, if the upper limit is determined, the probability of each bit from MSB to LSB making a transition can be found with ease on the basis of the input signal distribution state.

In the second step of the above-described power dissipation estimating method, if the aforesaid upper limit is large, Prob Pvr (i.e., the probability that each bit's value makes a transition) is found by the following formula:

$$Pvr=2\times P(1)\times P(0);$$

where P(1) is the probability that each bit value is logical "1" and P(0) is the probability that it is logical "0".

If the upper limit is large, then the post-transition input signal value is not affected by the pre-transition input signal value. Accordingly, the probability of each bit making a transition can be found at a high speed by the aforesaid formula.

In the second step of the above-described power dissipation estimating method, where the upper limit is low, (a) a distribution region of the input signal is zoned into n sub-regions i (i=1 ... n) having a predetermined width, (b) Prob P1i(0) (i.e., the probability that each bit j, o, u, k, i makes a 1→0 transition after one clock signal is applied) and Prob P0i(1) (i.e., the probability that each bit makes a 0→1 transition after one clock signal is applied) are found for each sub-region i, and (c) Prob Pvr (i.e., the probability that each bit's value makes a transition) is found by the following formula:

$$Pvr=\Sigma\{P1i(0)+P0i(1)\}.$$

If the aforesaid upper limit is low, then the post-transition input signal value is affected by the pre-transition input signal value. However, in accordance with the above-described arrangement, even if the upper limit is low, the probability that each bit makes a transition can be found easily from the above formula.

In the second step of the above-described power dissipation estimating method, if the input signal is a signal formed by a data item having a random logical value, a probability that each bit makes a transition in value is set at ½.

As a result of such arrangement, the transition probability can be found easily even for input data having a random logical value.

In the above-described power dissipation estimating method, the electrical circuit has logical circuits formed by plural devices and plural signal lines (e.g., AND circuits, OR circuits, NOR circuits, NAND circuits, EXOR circuits), and each logical circuit is unitized to become an element, and a probability that an input signal to the element makes a transition as well as a probability that an output signal from the element makes a transition is prefounded.

As to basic logical circuits (e.g., AND and OR), a truth table for input and output can be determined uniquely. Accordingly, by unitizing such a logical circuit into one element, estimating power dissipation can be performed rapidly.

In order to achieve the second object, the present invention provides a method for determining an optimum layout/interconnection routing plan for an electrical circuit comprising a plurality of elements each of which has a plurality of signal lines by estimating power dissipation in the electrical circuit. This method comprises:

a first step of finding, based on a product obtained by multiplying a probability that an input signal to each element makes a transition by a probability that a corresponding output signal from each element makes a transition in response to a change in the input signal, a formula by which the output signal transition probability is expressed as a function of the input signal transition probability;

a second step of assigning a predetermined input signal transition probability to an input signal;

a third step of sequentially finding, when the input signal having the predetermined transition probability is applied to the electrical circuit, a probability that an output signal makes a transition, by making use of the formula;

a fourth step of estimating the power dissipation by multiplying each signal transition probability by each signal line's load, and by summing together products found; and a fifth step of determining the optimum layout/interconnection routing plan in order that the found estimated power dissipation is controlled by lowering the load of a particular signal line through which a signal with a high transition probability is transferred.

In order to achieve the third object, the present invention provides an apparatus of estimating power dissipation in an electrical circuit comprising a plurality of elements each of which has a plurality of signal lines. This apparatus comprises:

a storage unit for pre-storing, based on a product obtained by multiplying a probability that an input signal to each element makes a transition by a probability that a corresponding output signal from each element makes a transition in response to a change in the input signal, a formula by which the output signal transition probability is expressed as a function of the input signal transition probability;

a transition probability setting means for setting an input signal transition probability;

an estimating operation performing means for estimating the power dissipation by finding, by making use of the formula, a probability that an output signal makes a transition with respect to the input signal transition probability and by summing products obtained by multiplying each signal transition probability by each the signal line's load.

The present invention provides an inexpensive power dissipation estimating apparatus capable of fast estimation of power dissipation.

BRIEF DESCRIPTION OF THE DRAWING FIGURES

FIG. 3 is a diagram showing the entry contents of a cell library of the LSI design system.

FIG. 4 is a diagram showing the entry contents of a net signal statistical information section of the LSI design system.

FIG. 13a is a binary decision diagram for $OP_1$, whereas FIG. 13b is a binary decision diagram for $OP_2$.

DETAILED DESCRIPTION OF THE INVENTION

EMBODIMENT 1

Figure 1:
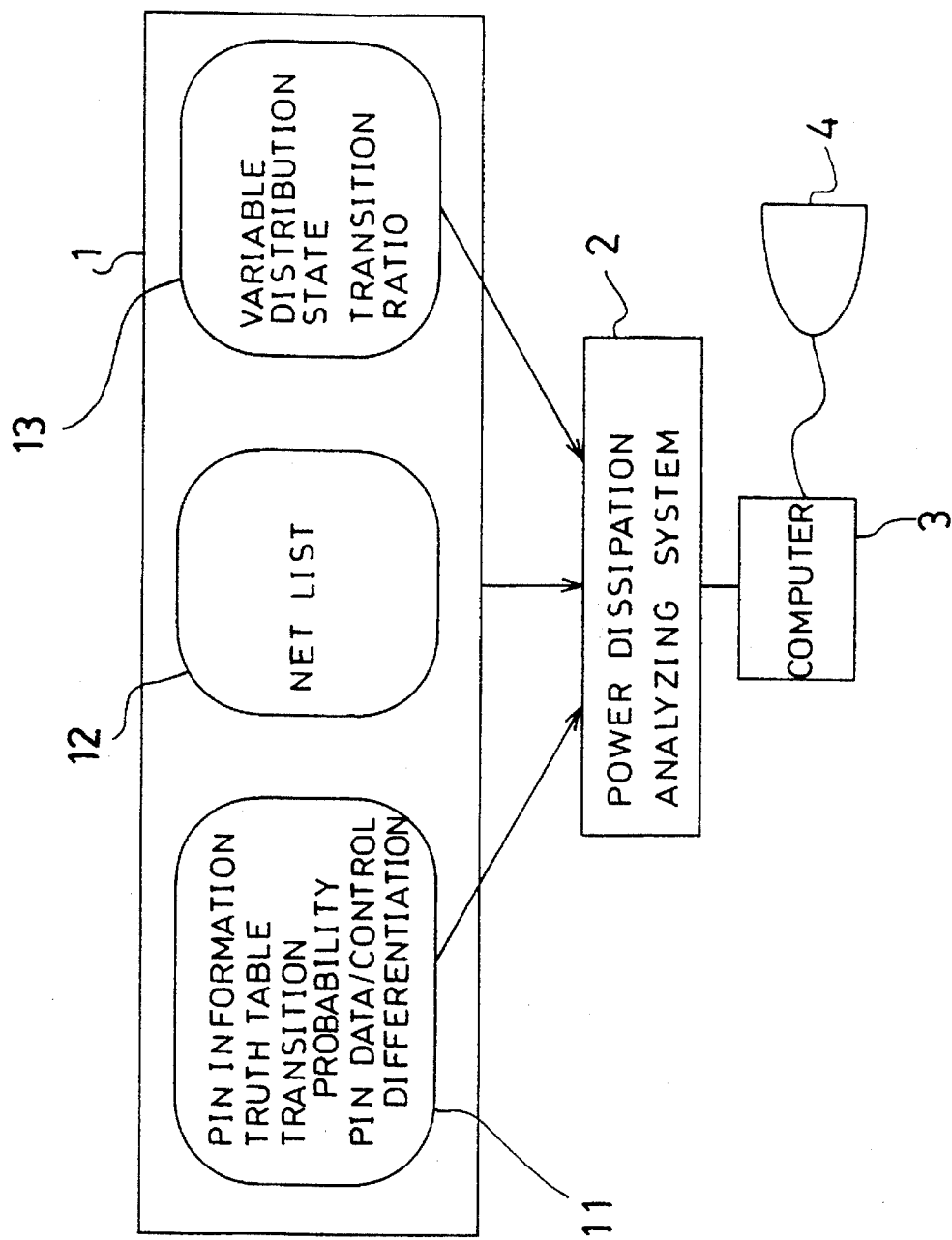
FIG. 1 is a block diagram showing part of an LSI design system according to the present invention.

FIG. 1 shows part of the structure of an LSI design system of the present embodiment. This LSI design system includes the following: a storage unit 1; a power dissipation analyzing unit 2; a computer 3; and a display unit 4. The storage unit 1 has a cell library 11, a net list section 12, and a net signal statistical information section 13. The power dissipation analyzing unit 2 performs, on the basis of the stored information of the storage unit 1, an arithmetic operation to estimate power dissipation in an electrical circuit. The computer 3 determines, on the basis of the estimate found by the power dissipation analyzing unit 2, an optimum layout/routing plan. The display unit 4 displays the results of the analysis and the arithmetic operation. A power dissipation estimating apparatus of the present invention is implemented with the storage unit 1 and the power dissipation analyzing unit 2.

The cell library 11 stores various information including pin information, truth table for input and output, signal transition probability, pin data, control differentiation. FIG. 3 shows a truth table for input and output of an element stored in the cell library 11 and an example of the pin-to-pin signal transition probability. FIG. 4 shows an example of the net signal statistical information stored in the net signal statistical information section 13. Note that FIGS. 3 and 4 are for an electrical circuit having an element 41 with two input terminals 42a, 42b at which input signals $IP_1$ and $IP_2$ are applied, a control input terminal 43 at which a control signal $QP_1$ is applied, and two output terminals 44a, 44b at which output signals $OP_1$ and $OP_2$ are provided (see FIG. 5)

Figure 2:
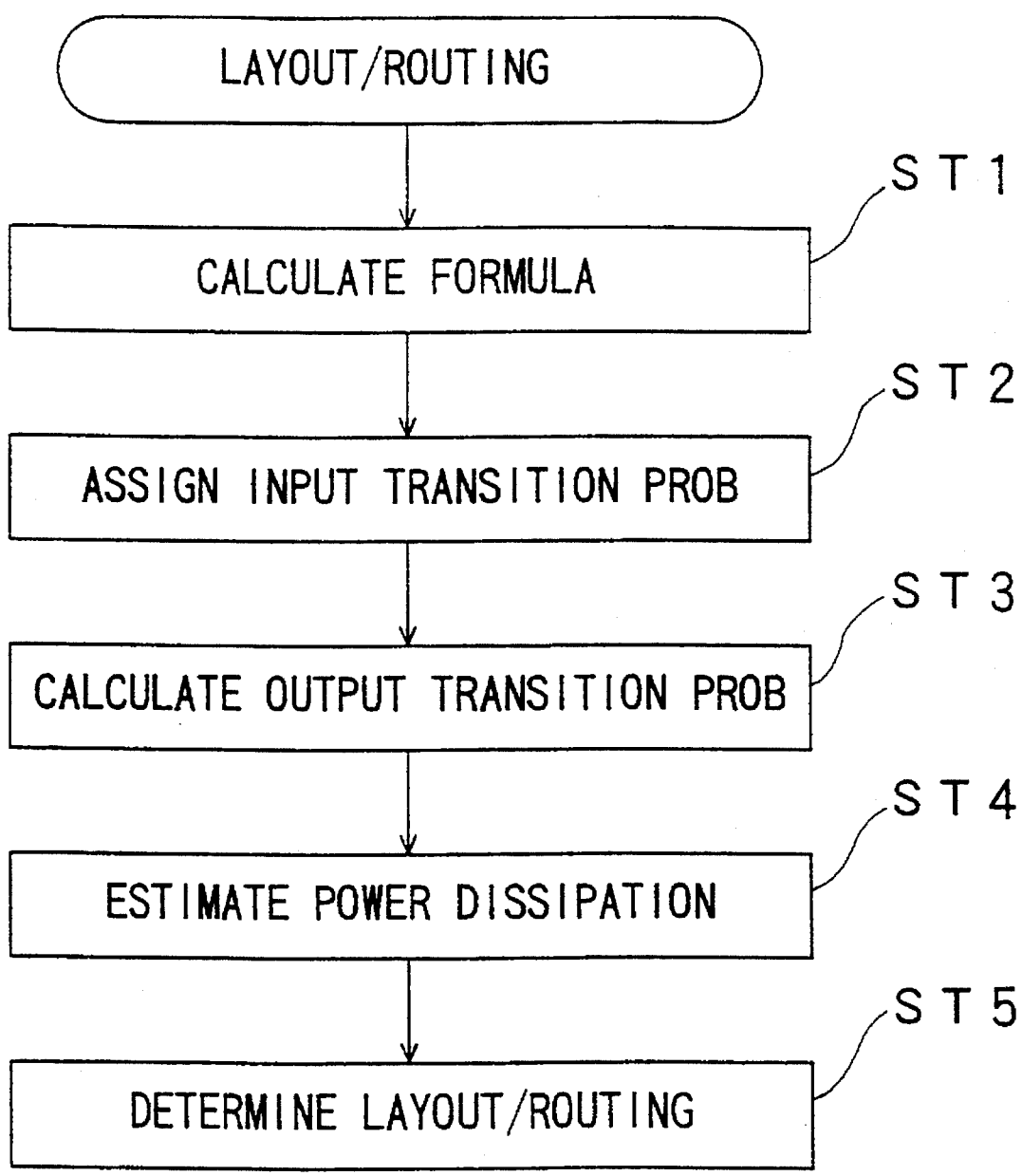
FIG. 2 is a sequence diagram illustrating the operation of determining a layout/routing plan according to the present invention.

FIG. 2 is a sequence diagram illustrating the operation of determining an optimum layout/routing plan by means of the aforesaid LSI design system. Based on the stored information of the cell library 11 and the net signal statistical information section 13, a formula is calculated at STEP ST1 which defines the relationship between the probability that an input signal makes a transition and the probability that an output signal makes a transition. At STEP ST2, an input signal is given a transition probability. At STEP ST3, a probability that a corresponding output signal makes a transition is computed. At STEP ST4, power dissipation is estimated. Finally, at STEP ST5, an optimum layout/routing plan is determined considering the estimated power consumption.

Figure 5:
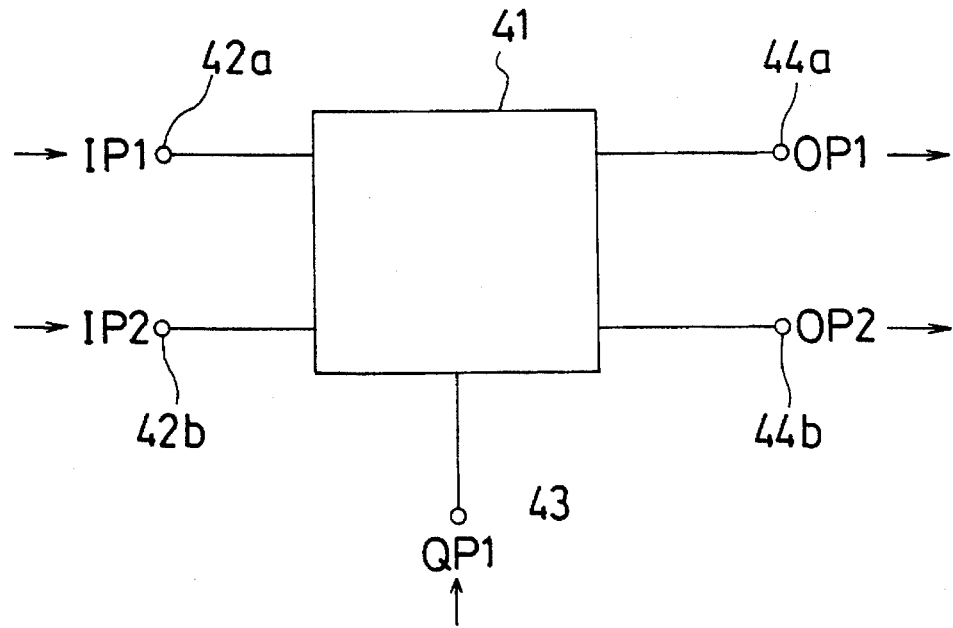
FIG. 5 is a schematic illustrating the structure of a circuit element for use in finding the probability that an output signal makes a transition as an input signal changes.

The operation of FIG. 2 is now discussed in detail using an electrical circuit as a result of further generalizing the circuit of FIG. 5. This circuit receives an input signal $IP_i$ and provides an output signal $OP_j$.

STEP ST1 is first explained. A formula is calculated which expresses the relationship between the input signal transition probability and the output signal transition probability. Such a formula is obtained as follows. For example, possible $IP_i/OP_j$ combinations concerning an element (i.e., possible events) are described in TABLE 1. The probabilities of respective events are PROB P1, PROB P2, PROB P3, and PROB P4.

TABLE 1

| INPUT | OUTPUT | PROBABILITY |
| --- | --- | --- |
| 1 | 1 | P1 |
| 0 | 1 | P2 |
| 1 | 0 | P3 |
| 0 | 0 | P4 |

Based on TABLE 1, PROB P1 (i.e., the probability of outputting logical "1" when inputting logical "1"), PROB P2 (i.e., the probability of outputting logical "1" when inputting logical "0"), PROB P3 (i.e., the probability of outputting logical "0" when inputting logical "1"), and PROB P4 (i.e., the probability of outputting logical "0" when inputting logical "0") are found.

PROB $PvO_{1-0}$, i.e., the probability that an output signal makes a transition when an input signal makes a 1→0 transition, is given by the following formula (1).

$$PvO_{1-0}=P1 \times P4+P2 \times P3 \tag{1}$$

Likewise, PROB $PvO_{0-1}$, i.e., the probability that an output signal makes a transition when an input signal makes a 0→1 transition, is given by the following formula (2).

$$PvO_{0-1}=P4 \times P1+P3 \times P2 \tag{2}$$

PROB $PvO_{i-j}$, i.e., the probability that $OP_j$ makes a transition when $IP_i$ makes a transition, is given by the following formula (3):

$$PvO_{i\text{-}j}=2\times(P4\times P1+P3\times P2) \quad (3)$$

The formula (3) is generalized, so that the probability that the output signal makes a transition (i.e., PROB $PvO_j$) can be given by the following formula (4) if the probability that $IP_i$ makes a transition (i.e., PROB $PvI_i$) is found.

$$PvO_j=\Sigma PvO_{i\text{-}j}\times PvI_i \quad (4)$$

$\Sigma$ of the formula (4) indicates execution of add operation on i (=1~n), with respect to n input signals to a specific element. PROB $PvO_{i\text{-}j}$, which is the probability that $OP_j$ makes a transition depending on $IP_i$, is found from the truth table. $PvO_{i\text{-}j}$ is multiplied by $PI_i$ for each input signal line and the products found are summed together. In other words, the formula (4) is a formula that expresses the output signal transition probability as a function of the input signal transition probability.

When actually estimating power dissipation, it is convenient for computation that the signal transition probability is converted into the number of times a signal makes a transition. If the number of times $IP_i$ makes a transition (i.e., $CvI_i$) is given for easy conversion from the formula (4), the number of times $OP_j$ makes a transition (i.e., $CvO_j$) is generally given by the following formula (5).

$$CvO_j=\Sigma PvO_{i\text{-}j}\times CvI_i \quad (5)$$

Accordingly, in actual computations, use of the formula (5) where $CvI_i$ is a variable and $CvO_j$ is a factor of $CvI_i$ is preferable.

An example of the computation on the electrical circuit of FIG. 5 having TABLE 1 is described. PROB $PvO_{1\text{-}1}$, i.e., the probability that $OP_1$ changes as $IP_1$ changes, is computed. PROB P1 that $IP_1$="1" and $OP_1$="1" is ¼ (see FIG. 3). PROB P2 that $IP_1$="0" and $OP_1$="1" is ⅛. PROB P3 that $IP_1$="1" and $OP_1$="0" is ¼. PROB P4 that $IP_1$="0" and $OP_1$="0" is ⅜. Therefore, PROB $PvO_{1\text{-}1}$ (i.e., the probability that $OP_1$ changes as $IP_1$ changes) can be obtained as follows by making use of the formula (3). Since the probability of each input signal state cannot be determined when the cell library 11 is set, they are set having the same probability of ⅛.

$$\begin{aligned}PvO_{1\text{-}1} &= 2\times(P4\times P1+P3\times P2)\\ &= 2\times\{(3/8)\times(1/4)+(1/4)\times(1/8)\}\\ &= 1/4=0.25\end{aligned}$$

By performing computations in the same way as above, both the probability that $OP_1$ changes and the probability that $OP_2$ changes as $IP_i$ changes (i.e., PROB $PvO_{i\text{-}1}$ and PROB $PvO_{i\text{-}2}$) are obtained (see FIG. 3). If both the probability that $IP_1$ changes and the probability that $IP_2$ changes (i.e., PROB $PvI_1$ and PROB $PvI_2$) are found, this allows both the probability that $OP_1$ changes as $IP_1$ changes and the probability that $OP_2$ changes as $IP_2$ changes (i.e., PROB $PrO_1$ and PROB $PrO_2$) to be obtained by making use of the formula (4).

Next, STEP ST2 is discussed in detail. The input signal transition probability can be found using either Method (I) or Method (II), depending upon the input data type.

Method (I) is employed if an input signal is a numeric value data item of plural bits. The probability that an input signal makes a transition in logical value after an elapse of one clock cycle time is statistically found by determining an input signal distribution state to be either a normal distribution or a uniform distribution and by determining the upper limit of the amount of variation in the input signal value per one clock cycle. For example, depending on the input signal distribution state, the probability that each signal logical value (i.e, a bit value) indicative of a value of each bit from MSB to LSB makes a transition is found as follows.

(i) If the aforesaid upper limit is sufficiently high, then the post-transition signal value is not affected by the pre-transition signal value. In other words, the post-transition signal is able to have a value independent of its pre-transition value. Therefore, the probability of being "1" is found by summing together the probability that a signal value makes a 1→0 transition and the probability that a signal value makes a 0→1 transition. If the probability that a bit value is "1" is expressed by PROB Pk(1) and the probability that it is "0" is expressed by PROB Pk(0), the probability that a bit value makes a transition (i.e., PROB Pvrk) is given by the following formula (6).

$$Pvrk=2\times Pk(1)\times Pk(0) \quad (6)$$

Figure 8:
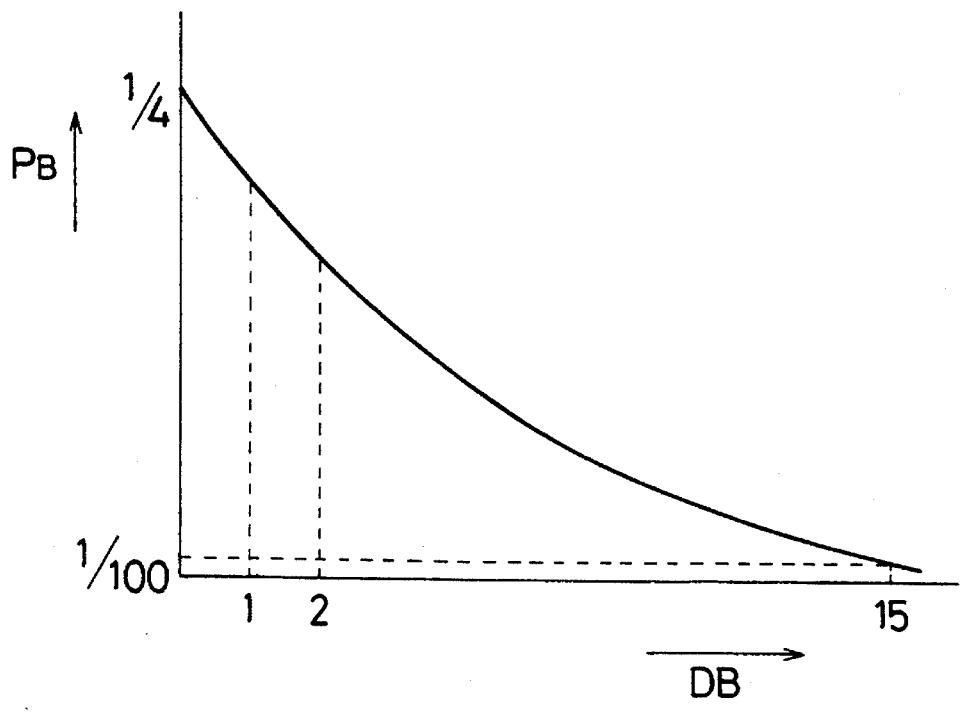
FIG. 8 is a characteristic diagram for input data whose occurrence probability decreases as the numeric value thereof increases.

(ii) If the variation width of input data is not great, then the post-transition signal value is affected by the pre-transition signal value. FIG. 8 is a chart illustrating an input signal distribution. This input signal distribution is divided, in the variable distribution direction, into individual regions ($Re_i$) having a uniform variation width. Then, both the probability that a bit value makes a 1→0 transition after one clock signal is applied (i.e., PROB Pvrk(0)) and the probability that a bit value makes a 0→1 transition after one clock signal is applied (i.e., PROB Pvrk(1)) are found for each $Re_i$. PROB Pvrk (i.e., the probability that a bit value makes a transition) is given by the following formula (7).

$$Pvrk=\Sigma\{Pvrk(0)+Pvrk(1)\} \quad (7)$$

Method (I) finds applications in cases where an input data item of one bit is a random logical value. PROB Pk(1) is ½, and PROB Pk(0) is ½. Therefore PROB Pvrk is given by the following formula (8).

$$Pvrk=2\times Pk(1)\times Pk(0)=½ \quad (8)$$

This is a phenomenon that frequently takes place in electrical circuits for automatic control.

Upon finding the probability that an input signal makes a transition by means of the above-described method, the number of times an input signal makes a transition can be obtained by multiplying that input signal transition probability by a uniform numeric value (i.e., a total of the numbers of times all the input signals make transitions).

A routine of finding, based on the above-described method, the probability that an input signal makes a transition is described in detail.

Figure 6:
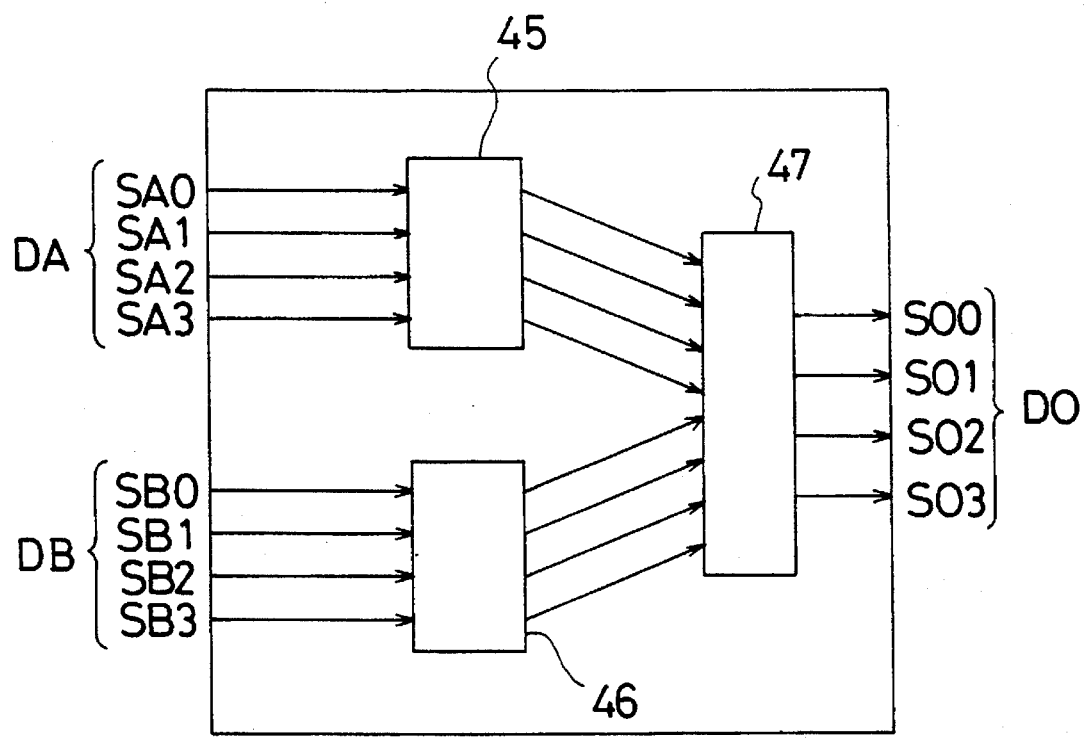
FIG. 6 is a block diagram depicting a logical circuit to which an input signal of four bits is applied.

Here, for description purposes, an electrical circuit including three elements 45, 46, and 47 is used (see FIG. 6). The element 45 receives and converts data DA of four bits SA0–SA8 each representing a logical value of "1" or "0". The element 46 likewise receives and converts data DB of four bits SB0–SB3 each representing a logical value of "1" or "0". The element 47 receives and converts the outputs of the elements 45 and 46, thereafter providing data DO of four bits SO0–SO3 each representing a logical value of "1" or "0". Note that SA0, SB0, and SO0 are each an LSB, and that SA3, SB3, and SO3 are each an MSB, and further note that DA has a distribution state that the probability of occurrence, PA, is a uniform value of ¹⁄₁₆ (see FIG. 7), and that DB has a distribution state that the probability of occurrence, PB, decreases as DB increases (see FIG. 8).

TABLE 2 shows RROB Pk(1) (i.e., the probability that each of SA0–SA3, SB0–SB3 becomes logical "1" when the amount of variation in the signal value is great), where k =A0–A3, B0–B3. TABLE 2 also shows possible values that DA and DB can have when SA0–SA3, SB0–SB3 are logical "1".

TABLE 2

|     | Pk(1) | POSSIBLE VALUES |
| --- | --- | --- |
| SA0 | 0.5 | 1, 3, 5, 7, 9, 11, 13, 15 |
| SA1 | 0.5 | 2, 3, 6, 7, 10, 11, 14, 15 |
| SA2 | 0.5 | 4, 5, 6, 7, 12, 13, 14, 15 |
| SA3 | 0.5 | 8, 9, 10, 11, 12, 13, 14, 15 |
| SB0 | 0.5 | 1, 3, 5, 7, 9, 11, 13, 15 |
| SB1 | 0.5 | 2, 3, 6, 7, 10, 11, 14, 15 |
| SB2 | 0.4 | 4, 5, 6, 7, 12, 13, 14, 15 |
| SB3 | 0.24 | 8, 9, 10, 11, 12, 13, 14, 15 |

PROB PB, i.e., the probability of having the same data with respect to each value of DB, comprised of SB0–SB3, is shown in TABLE 3.

TABLE 3

| VALUES OF DA | PB |
| --- | --- |
| 0 | 1/4 |
| 1 | 1/4 |
| 2 | 1/4 |
| 3 | 1/4 |
| 4 | 1/4 |
| 5 | 1/4 |
| 6 | 1/4 |
| 7 | 1/4 |
| 8 | 1/16 |
| 9 | 1/20 |
| 10 | 1/25 |
| 11 | 1/35 |
| 12 | 1/40 |
| 13 | 1/45 |
| 14 | 1/50 |
| 15 | 1/100 |

A sum of probabilities that DB has values of from 8 to 15 (i.e., 1/16+1/20+1/25+1/35+1/40+1/45+1/50+1/100) corresponds to the probability that SB3 becomes logical "1". In this case, as shown in TABLE 2, the probability is 0.24 that SB3 becomes logical "1".

The probability that each bit value (SA0–SA3, SB0–SB3) becomes logical "1" is found. Based on the found probability, the probability that an input signal makes a transition is found. PROB Pk(0) (i.e., the probability that each bit value becomes logical "0") is a complementary probability to PROB Pk(1) (i.e., the probability that each bit value becomes logical "1"), so that PROB Pk(0) is given by the following formula (9).

$$Pk(0) = 1 - Pk(1) \qquad (9)$$

Therefore, from the formula (9), PROB PvrA0, PROB PvrA1, PROB PvrA2, and PvrA3 (i.e., the probabilities that SA0, SA1, SA2, and SA3 make transitions) and PROB PvrB0, PROB PvrB1, PROB PvrB2, and PROB PvrB3 (i.e., the probabilities that SB0, SB1, SB2, and SB3 make transitions) are computed as follows.

$$PvrA0 = 2 \times PA0(1) \times PA0(0)$$
$$= 2 \times 0.5 \times 0.5 = 0.5;$$

$$PvrA1 = 2 \times PA1(1) \times PA1(0)$$
$$= 2 \times 0.5 \times 0.5 = 0.5;$$

$$PvrA2 = 2 \times PA2(1) \times PA2(0)$$
$$= 2 \times 0.5 \times 0.5 = 0.5;$$

$$PvrA3 = 2 \times PA3(1) \times PA3(0)$$
$$= 2 \times 0.5 \times 0.5 = 0.5;$$

$$PvrB0 = 2 \times PB0(1) \times PB0(0)$$
$$= 2 \times 0.5 \times 0.5 = 0.5;$$

$$PvrB1 = 2 \times PB1(1) \times PB1(0)$$
$$= 2 \times 0.5 \times 0.5 = 0.5;$$

$$PvrB2 = 2 \times PB2(1) \times PB2(0)$$
$$= 2 \times 0.4 \times 0.6 = 0.48; \text{ and}$$

$$PvrB3 = 2 \times PB3(1) \times PB3(0)$$
$$= 2 \times 0.24 \times 0.76 = 0.36$$

The possibility of DA (DB), comprised of SA0–SA3 (SB0–SB3) and applied to the element 45 (46) of FIG. 6, makes a transition is found.

Figure 7:
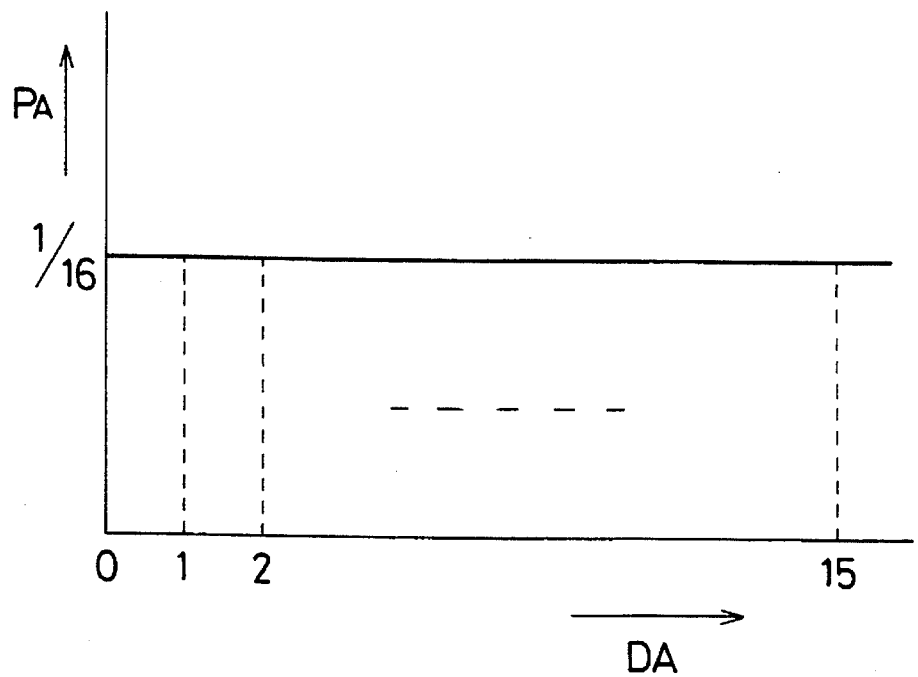
FIG. 7 is a characteristic diagram for input data having a uniform distribution.
Figure 9:
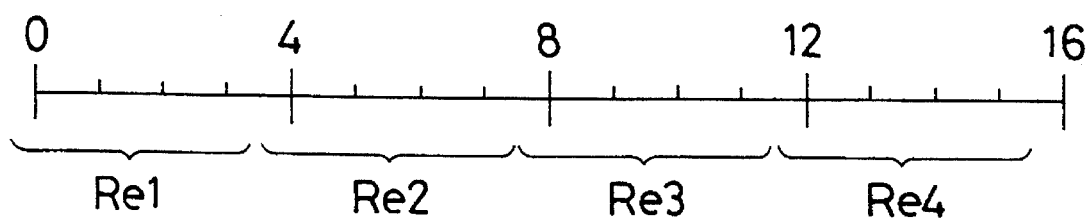
FIG. 9 is a descriptive diagram illustrating a way of dividing a 4-bit data item into a plurality of regions.

Next, a routine of calculating the probability that the input signal makes a transition when the amount of variation in the signal value is small is described in detail. The description will be made by employing the signal states as shown in FIGS. 6–8, and the signal value variation is 4 or less per one clock cycle, that is, the upper limit of the signal value variation is set at 4. A calculation routine concerning SA3 is described. As shown in FIG. 9, a region defined between values 0 and 15 of DA is divided into four equal sub-regions, $Re_1$, $Re_2$, $Re_3$, and $Re_4$ having a uniform variation width of 4. TABLE 4 shows PROB PA3(1) (i.e., the probability of SA3 being logical "1" in each sub-region), and PROB P1A3(0) (i.e., the probability of SA3 being logical "0" in each sub-region) after application of one clock signal.

TABLE 4

| REGION | PA3(1) | P1A3(0) |
| --- | --- | --- |
| $Re_1$ | 0 | 1 |
| $Re_2$ | 0 | (1/16)(8/9) + (1/16)((7/9) + (1/16)(6/9) + (1/16)(5/9) |
| $Re_3$ | 1 | (1/16)(4/9) + (1/16)((3/9) + (1/16)(2/9) + (1/16)(1/9) |
| $Re_4$ | 1 | 0 |

PROB P1A3(0) (i.e., the probability of SA3 being logical "0" after one clock signal is applied) in each sub-region ($Re_1$, $Re_2$, $Re_3$, $Re_4$) is computed as follows. DA has a value between 0 and 7 when SA3 is logical "0", so that in the sub-region $Re_1$ the value of DA is 7 even if the amount of variation in the data value is 4. It then follows that PROB PIA3(0) is 1. In the sub-region $Re_2$, PROB PIA3(0) is computed by multiplying 1/16 (i.e., the probability that the present DA is 4, 5, 6, or 7) by each of 8/9, 7/9, 6/9, and 5/9 (i.e., the probability of becoming logical "0" after one clock signal is applied on the condition that each data value varies by 4 at most) and summing together the products found. In the sub-region $Re_3$, PROB PIA3(0) is likewise computed by multiplying 1/16 by each of 4/9, 3/9, 2/9, and 2/9 and summing together the products found. Finally, in the sub-region $Re_4$, even when the present DA has a minimum data value of 12, the data value will not be below 8 after one clock signal is applied. It then follows that PROB P1A3(0) is 0.

With TABLE 4, PROB PvrRi(0) (i=1 to 4), i.e., the probability of SA3 making a transition from logical "1" to logical "0" in each of the sub-regions $Re_{1-4}$, is computed as follows.

$PvrR1(0)=0\times1=0;$ $PvrR2(0)=0\times(26)/(16\times9)=0;$ $PvrR3(0)=10/(16\times9)=5/72;$ and $PvrR4(0)=1\times0=0$ From the above, PROB PvrA3(0), i.e., the probability that SA3 makes a 1→0 transition after one clock signal is applied, is computed as follows.

$PvrA3(0)=\Sigma PvrRi(0)=5/72$

Likewise, PROB PvrA3(1), i.e., the probability that SA3 makes a 0→1 transition after one clock signal is applied, is computed as follows.

$PvrA3(1)=\Sigma PvrRi(1)=5/72$

PROB PvrA3, i.e., the probability of SA3 making a transition from logical "1" to logical "0" and vice versa, is computed by making use of the formula (7).

$PvrA3=\Sigma PvrRi(0)+\Sigma PvrRi(1)=5/72+5/72=0.14$

Next, STEP ST4 of FIG. 2 is now described below in detail.

The power dissipation in each signal line, In, is found by multiplying together the number of times a signal on a signal line makes a transition, Sn, and the wiring capacitance, Cn. Note that Cn includes the capacitance of a gate connected with a wire. The power dissipation, I, and the power consumption, W, in a whole electrical circuit are given by the following formulas (10) and (11).

$$I=\Sigma(Sn\times Cn\times V) \quad (10)$$

$$W=V\times\Sigma(Sn\times Cn) \quad (11)$$

In each formula, V indicates the voltage and is assumed to have a constant value. Using the formula (5), the signal transition probability can be converted into the number of times a signal makes a transition.

At STEP ST5, an optimum layout/routing plan is determined taking into account the power consumption W.

Figure 10:
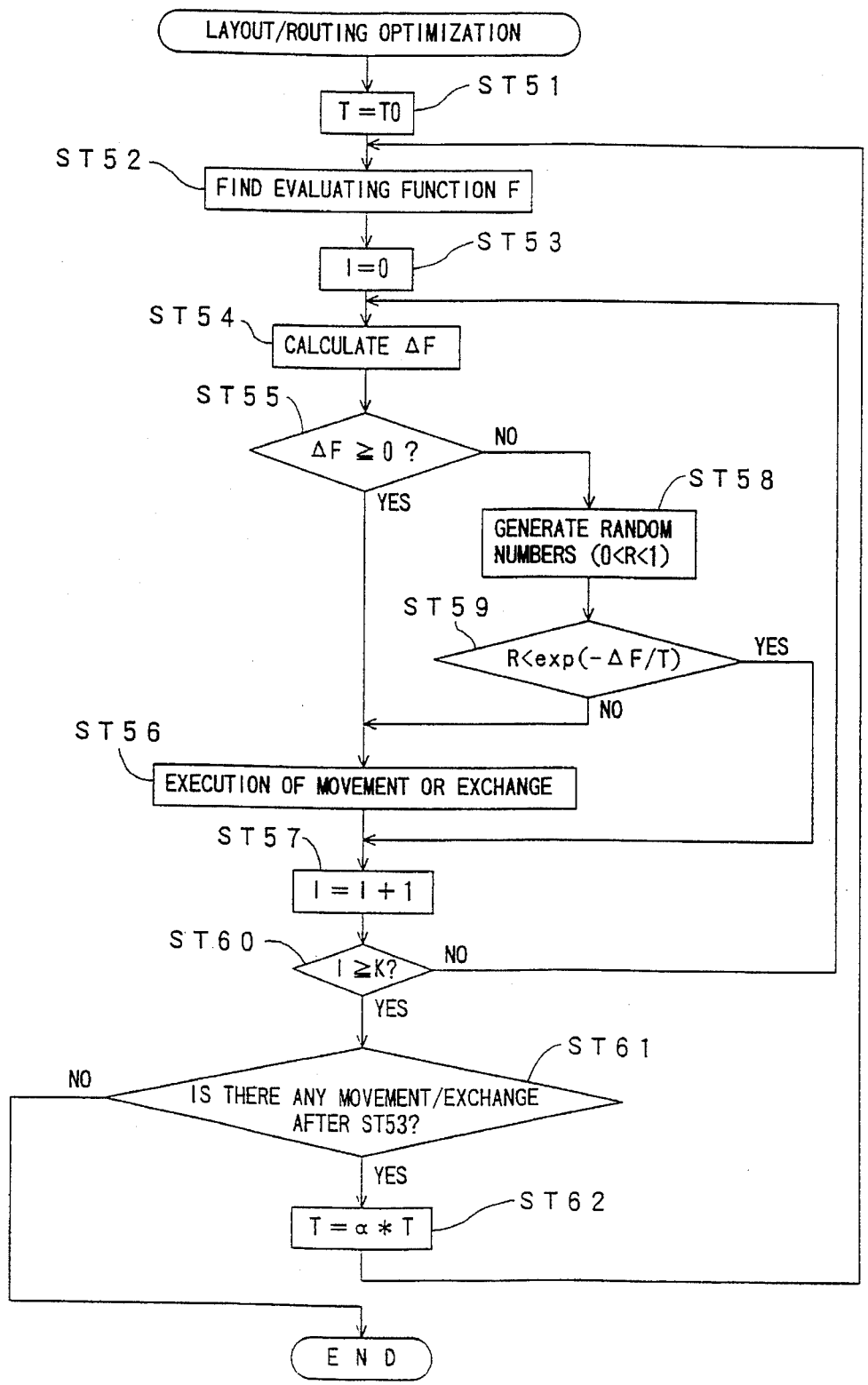
FIG. 10 is a sequence diagram illustrating the operation of optimizing a layout/routing plan by means of a simulated annealing method.

FIG. 10 shows a sub-flow illustrating in detail STEP ST5. In this layout/routing plan optimizing process, an objective function is set, and, by means of an iterative improvement method, the objective function is minimized. In the iterative improvement technique, a single transition in the cell movement or in the cell replacement is chosen at random or on the basis of evaluation rules, and a change in the objective function at the time of the occurrence of the aforesaid transition is observed, and a process to accept such a change under specific conditions is repeatedly performed, in order that the objective function is minimized. FIG. 10 shows a layout/routing plan optimizing process by a simulated annealing method that is one of the iterative improvement methods (see [21] S. Kirkpatrick, C. D. Gellatt and M. P. Vecchi, "Optimization by Simulated Annealing," Science, Vol. 220, N. 4598, pp. 671–680, May, 1983). In the present invention, a layout/routing plan optimizing process is implemented by setting an evaluating function of the layout/routing, F, for use by the iterative improvement method, as follows.

The following formula (12) is set for the evaluating function F.

$$F=A1\times\Sigma Ln+A2\times W \quad (12)$$

In the formula (12), A1 and A2 are the parameters, and $\Sigma Ln$ is the wiring length, and W is the power consumption found by STEPS ST1–ST4. In the present embodiment, A1=1 and A2=100, since the second term on the right-hand side in the formula (12) is given precedence to the others; however, clock lines are precluded from the signal lines in the evaluation formula (12).

In the FIG. 10, T, $\alpha$ and K are parameters all affecting the optimizing effect of the simulated annealing method. In the present embodiment, they are set such that T0=1, $\alpha$=0.9, and K=3000.

At STEP ST51, T is set at T0 (T=T0). At STEP ST52, circuit elements are arranged at random, to find the evaluation function F. Next, at STEP ST53, I is set at 0 (I=0). At STEP ST54, an increment $\Delta F$ is computed on the assumption that elements or elements in pairs are selected and are moved or exchanged.

STEP ST55 determines whether $\Delta F\geq 0$. If $\Delta F\geq 0$, this means that improvement can be expected from such movement or exchange, and the layout/routing plan optimizing program proceeds to the next step, STEP ST56. At STEP ST56, the movement or exchange is executed, and at STEP ST57 I is updated so that I=I+1. On the other hand, if STEP ST55 says NO meaning that the movement or exchange may produce no improvements, then the program moves to STEP ST58. At STEP ST58, random numbers, R, is generated (0<R<1). Then, STEP ST59 determines whether R<exp(–$\Delta F/T$). If STEP ST59 says NO, then the program moves to STEP ST56, and I is updated at STEP ST57. If STEP ST59 says YES, the program moves to STEP ST57 by-passing STEP ST56, and at STEP ST57 I is updated. Execution of STEPS ST58 and 59 contributes to preventing falling into a local optimum solution.

The program then moves to STEP ST60. STEP ST60 determines whether I$\geq$K. If STEP ST60 says NO, then the program moves back to STEP 54 and STEPS ST54–57 are repeated until STEP ST60 says YES. The program proceeds to STEP ST61. STEP ST61 determines whether any element movement or exchange has taken place after the setting of the initial values at STEP ST53. If STEP ST61 says YES, then the program moves further down to STEP ST62. Resetting is made to reduce the parameter T by a given rate (T=$\alpha$T) because it is judged that there still are possibilities for further improvement. Thereafter, the program returns to STEP ST52.

If STEP ST61 says NO, then the optimizing process ends making a judgement that no improvement possibilities are left.

Figure 11:
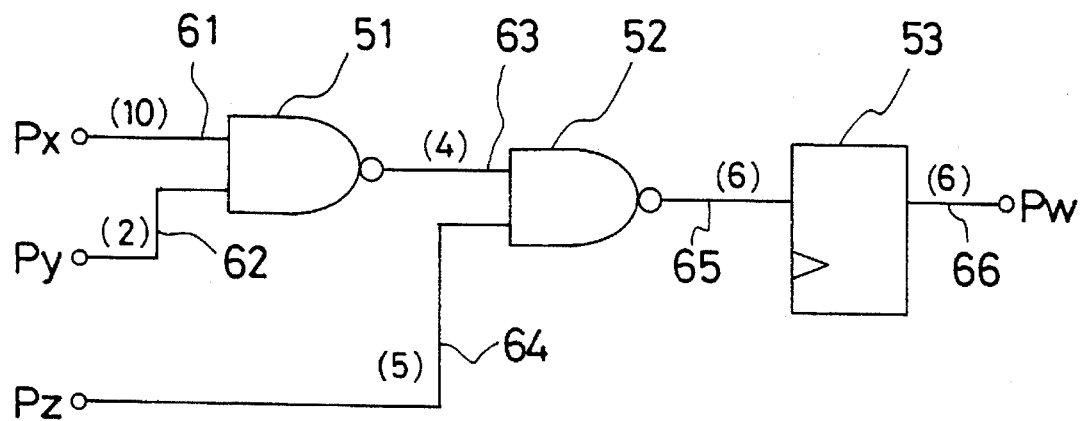
FIG. 11 is a circuit diagram showing a logical circuit for use in optimizing a layout/routing plan.

The above-described layout/routing plan optimization of the present invention will be described by making reference to a logical circuit of FIG. 11. This logical circuit includes a first NAND circuit 51, a second NAND circuit 52, and a flip-flop 53. The first NAND circuit 51 is connected, via signal lines 61 and 62, with input terminals Px and Py, and the output of the first NAND circuit 51 is logical "0" if both of its inputs, applied at the input terminals Px and Py, are logical "1". The second NAND circuit 52 is connected, via signal lines 63 and 64, with an output of the first NAND circuit 51 and with an input terminal Pz, and the output of the second NAND circuit 52 is logical "0" if both of its inputs, received from the first NAND circuit 51 and applied at the input terminal Pz, are logical "1". The flip-flop 53 is connected with the second NAND circuit 52 via a signal line 65 and temporarily holds an input signal transferred from the second NAND circuit 52. Each number of FIG. 11 enclosed by the round brackets indicates the number of times a signal makes a transition within a given period of time, found by the aforesaid analysis.

Figure 12:
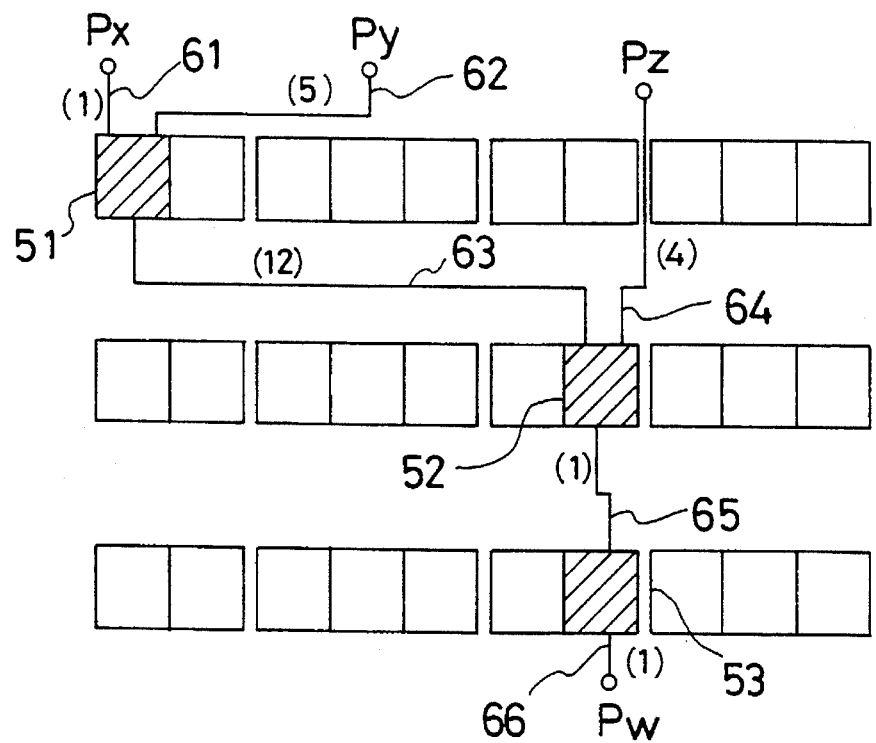
FIG. 12 is a diagram showing the layout of a logical integrated circuit for optimizing processing.

FIG. 12 shows a logical integrated circuit layout implemented by the present layout/routing optimizing method.

Each number enclosed by the round brackets in FIG. 12 indicates the wiring capacitance of each signal line.

The aforesaid evaluating function finds very wide applications in array-like layout/routing, linear layout for, for example, data paths, layout/routing of general blocks of different forms.

For the case of the CMOS semiconductor integrated circuit, nearly all power consumption is dissipated by signal line charge/discharge. In the present embodiment, when estimating power dissipation in an electrical circuit, not only the total length of all the signal lines but also the number of times each signal line makes a transition is considered. This improves the accuracy of estimating power dissipation.

Unlike the previously described time-consuming conventional technique dependent of a test pattern, the present embodiment provides high-speed, high-accuracy power dissipation estimating method, thereby making it possible to generate an optimum layout/routing plan of an electrical circuit.

EMBODIMENT 2

A second preferred embodiment of the present invention is now described. The second embodiment makes use of the FIG. 1 system and the processing routine of FIG. 2.

Whereas STEP ST1 of the first embodiment uses a truth table, the present embodiment employs a BDD (binary decision diagram) instead. FIGS. 13a and 13b each illustrate a BDD for finding the probability that an output signal (OP) changes as an input signal (IP) changes. The relationship of input versus output is the same as shown in the FIG. 3 truth table. Each of vertexes CR1–CR8 represents a single binary function. 70A–H (71A–H) are paths. Each path extends from a vertex towards a subordinate vertex representing either a function in the case of the input variable value ="0" or a function in the case of the input variable value ="1". FIG. 13 also shows vertexes SQ1–SQ4. SQ1 indicates that the value of $OP_1$ is logical "1". SQ2 indicates that the value of $OP_1$ is logical "0". SQ3 indicates that the value of $OP_2$ is logical "1". SQ4 indicates that the value of $OP_2$ is logical "0".

Referring to FIG. 13a, if $IP_1$="0", $IP_2$="0", and $QP_1$ ="1" or if $IP_1$="1" and $IP_2$="0", then $OP_1$="1".

Referring to FIG. 13b, if $IP_1$="0" and $IP_2$="1", or if $IP_1$="1", $IP_2$="0", and $QP_1$="1", then $OP_2$="1".

In other words, FIG. 13 and FIG. 3 are identical with each other in contents.

Next, by making use of FIG. 13, a routine of finding PROB $PvO_{i-j}$, i.e., the probability of an output signal ($OP_1$, $OP_2$) changes as an input signal ($IP_1$, $IP_2$, $QP_1$) changes, is described.

(a) Probability of $OP_1$ becoming "1" if $IP_1$="1"

Since the probability of $IP_1$, $IP_2$ becoming "1" and the probability of $IP_1$, $IP_2$ becoming "0" are the same, the probability of $IP_1$="1" (i.e., the probability of passing through PATH 70F) is ½. If probabilities with respect to all the paths extending from CR3 towards SQ1 are found, this should find the probability of $OP_1$ becoming "1" if $IP_1$="1". After all, PATH 70G is the only path that extends from CR3 to SQ1. Thus the probability is (½)×(½)=¼ that $OP_1$ becomes logical "1".

(b) Probability of $OP_1$ becoming "0" if $IP_2$="1"

There are two possible routes capable of allowing $OP_1$ to become "0" if $IP_2$="1". One is a route that reaches SQ2 via PATH 70A and PATH 70F, and the other is a route that reaches SQ2 via PATH 70D and PATH 70E. Therefore the probability is (½)×(½)+(½)×(½)=½ that $OP_1$ becomes "0" if $IP_2$="1".

(c) Probability of $OP_1$ becoming "0" if control signal $QP_1$="1"

There are no routes from CR4 to reach SQ2. There are only routes to reach SQ2 by-passing CR4. The probability is (½)×(½)+(½)×(½)=½ that $OP_1$ becomes "0" if $QP_1$="1".

(d) Other probabilities

By performing computation in the same way as above, the following probabilities can be found:

| (i) Between $IP_1$ and $OP_1$ | |
|---|---|
| Probability of $OP_1$ becoming "1" if $IP_1$ = "1" | 1/4 |
| Probability of $OP_1$ becoming "1" if $IP_1$ = "0" | 1/8 |
| Probability of $OP_1$ becoming "0" if $IP_1$ = "1" | 1/4 |
| Probability of $OP_1$ becoming "0" if $IP_1$ = "0" | 3/8 |
| (ii) Between $IP_1$ and $OP_2$ | |
| Probability of $OP_2$ becoming "1" if $IP_1$ = "1" | 1/8 |
| Probability of $OP_2$ becoming "1" if $IP_1$ = "0" | 1/4 |
| Probability of $OP_2$ becoming "1" if $IP_1$ = "0" | 3/8 |
| Probability of $OP_2$ becoming "0" if $IP_1$ = "0" | 1/4 |
| (iii) Between $IP_2$ and $OP_1$ | |
| Probability of $OP_1$ becoming "1" if $IP_2$ = "1" | 0 |
| Probability of $OP_1$ becoming "1" if $IP_2$ = "0" | 3/8 |
| Probability of $OP_1$ becoming "0" if $IP_2$ = "1" | 1/2 |
| Probability of $OP_1$ becoming "1" if $IP_2$ = "1" | 1/8 |
| (iv) Between $IP_2$ and $OP_2$ | |
| Probability of $OP_2$ becoming "1" if $IP_2$ = "1" | 1/4 |
| Probability of $OP_2$ becoming "1" if $IP_2$ = "0" | 1/8 |
| Probability of $OP_2$ becoming "0" if $IP_2$ = "1" | 1/4 |
| Probability of $OP_2$ becoming "0" if $IP_2$ = "0" | 3/8 |

Finally, as in the first embodiment, the probability that an output signal makes a transition as an input signal changes is computed. That is, PROB $Pv0_{i-1}$ ($Pv0_{i-2}$), i.e., the probability that $OP_1$ ($OP_2$) changes as $IP_i$ changes, is computed. If PROB $PvI_1$ (i.e., the probability that $IP_1$ makes a transition) and PROB $PvI_2$ (i.e., the probability that $IP_2$ makes a transition) are found, then PROB $PvO_1$ (i.e., the probability that $OP_1$ changes as $IP_1$ changes) and PROB $Pv0_2$ (i.e., the probability that $OP_2$ changes as $IP_2$ changes) can be found by making use of the formula (4).

Although not described here, a routine of finding an input signal transition probability, and a layout/routing optimization process to minimize power dissipation are the same as described in the first embodiment.

In accordance with the present embodiment, the time taken for computing the transition probability is reduced in comparison with the first embodiment. Since the first embodiment uses a truth table, this requires preparation of $2^n$ truth tables if the number of input signal lines is n and the number of output signal lines is n. Conversely, in the present embodiment that uses a BDD, a compressed diagram with n×K vertexes, where K is a constant, is possible in most cases. Therefore as the number of elements increases the computing time is reduced.

The invention claimed is:

1. A method of estimating power dissipation in an electrical circuit comprising two or more elements connected together, an input line coupled to said element to receive input signals, and an output line coupled to said element to provide output signals, said power dissipation estimating method comprising:

a first step of finding, based on a product obtained by multiplying a probability that an input signal to a first element makes a transition by a probability that a corresponding output signal from said first element makes a transition in response to a change in said input signal, a formula by which said output signal transition probability is expressed as a function of said input signal transition probability;

a second step of assigning a predetermined input signal transition probability to an input signal;

a third step of finding, when said input signal having said predetermined transition probability is applied to said electrical circuit, a probability that a corresponding output signal from said element makes a transition, by making use of said formula, wherein said formula is used to first find, from a probability that an input signal to a first element of said elements makes a transition, a probability that a corresponding output signal from said first element makes a transition, and then to find, from a probability that an input signal to a second element of said elements makes a transition, or from said output probability that a corresponding output signal from said second element makes a transition; and a fourth step of estimating said power dissipation by multiplying said input signal transition probability by said input line's load and multiplying said output signal transition probability by said output line's load, and by summing together products found.

2. The power dissipation estimating method as in claim 1 wherein:

in said first step, said formula is found by making use of a truth table for an input and output of said first element.

3. The power dissipation estimating method as in claim 1 wherein:

in said first step, said formula is found by making use of a binary decision diagram (BDD).

4. The power dissipation estimating method as in claim 1 wherein:

in said second step, if said input signal is formed by an item of data of plural bits, a distribution state of said input signal and an upper limit of variation in the value of said data item per one clock signal are determined, to find a probability that each said bit makes a transition in value after one clock signal is applied.

5. The power dissipation estimating method as in claim 1 wherein:

in said second step, if said upper limit is large, Prob Pvr (i.e., the probability that each said bit's value makes a transition) is found by the following formula:

$$Pvr = 2 \times P(1) \times P(0);$$

wherein P(1) is the probability that each said bit's value is logical "1" and P(0) is the probability that each said bit's value is logical "0".

6. The power dissipation estimating method as in claim 1 wherein:

in said second step, if said upper limit is low, then:

a distribution region of said input signal is zoned into n sub-regions i (i=i ... n) having a predetermined width;

Prob P1i(0) (i.e., the probability that each bit j, o, u, k, i makes a 1→0 transition after one clock signal is applied) and Prob P0i(1) (i.e., the probability that each said bit makes a 0→1 transition after one clock signal is applied) are found for each said sub-region i; and Prob Pvr (i.e., the probability that each said bit's value makes a transition) is found by the following formula:

$$Pvr = \Sigma\{P1i(0) + P0i(1)\}.$$

7. The power dissipation estimating method as in claim 1 wherein:

in said electrical circuit, logical circuits including AND circuits, OR circuits, NOR circuits, NAND circuits, and EXOR circuits are arranged which are formed by plural devices and plural signal lines; and each said logical circuit is unitized to become an element, and a probability that an input signal to said element makes a transition as well as a probability that an output signal from said element makes a transition is prefounded.

8. The power dissipation estimating method as in claim 1, wherein said input line and said output line are data lines.

9. A method of determining an optimum layout/interconnection routing plan for an electrical circuit comprising a plurality of elements each of which has a plurality of signal lines by estimating power dissipation in said electrical circuit, said method comprising:

a first step of finding, based on a product obtained by multiplying a probability that an input signal to each said element makes a transition by a probability that a corresponding output signal from each said element makes a transition in response to a change in said input signal, a formula by which said output signal transition probability is expressed as a function of said input signal transition probability;

a second step of assigning a predetermined input signal transition probability to an input signal;

a third step of sequentially finding, when said input signal having said predetermined transition probability is applied to said electrical circuit, a probability that an output signal makes a transition, by making use of said formula;

a fourth step of estimating said power dissipation by multiplying each said signal transition probability by each said signal line's load, and by summing together products found; and a fifth step of determining said optimum layout/interconnection routing plan in order that said found estimated power dissipation is controlled by lowering the load of a particular signal line through which a signal with a high transition probability is transferred.

10. An apparatus of estimating power dissipation in an electrical circuit comprising a plurality of elements each of which has a plurality of signal lines, said apparatus comprising:

a storage unit for pre-storing, based on a product obtained by multiplying a probability that an input signal to each said element makes a transition by a probability that a corresponding output signal from each said element makes a transition in response to a change in said input signal, a formula by which said output signal transition probability is expressed as a function of said input signal transition probability;

a transition probability setting means for setting an input signal transition probability;

an estimating operation performing means for estimating said power dissipation by finding, by making use of said formula, a probability that an output signal makes a transition with respect to said input signal transition probability and by summing products obtained by multiplying each said signal transition probability by each said signal line's load.

* * * * *

UNITED STATES PATENT AND TRADEMARK OFFICE
CERTIFICATE OF CORRECTION

PATENT NO. : 5,602,753
DATED : February 11, 1997
INVENTOR(S) : Masahiro FUKUI

It is certified that error appears in the above-indentified patent and that said Letters Patent is hereby corrected as shown below:

Cover Page, line 3 at [54], in the title change "... APPARATUS FOR..." to --APPARATUS OF--.

Signed and Sealed this

Tenth Day of March, 1998

*Attest:*

BRUCE LEHMAN

*Attesting Officer*        *Commissioner of Patents and Trademarks*